United States Patent
Park et al.

(10) Patent No.: US 8,320,037 B2
(45) Date of Patent: Nov. 27, 2012

(54) ELECTRO-OPTIC DEVICE

(75) Inventors: Jeong Woo Park, Daejeon (KR); Jongbum You, Seongnam (JP); Gyungock Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 390 days.

(21) Appl. No.: 12/652,623

(22) Filed: Jan. 5, 2010

(65) Prior Publication Data

US 2011/0051222 A1    Mar. 3, 2011

(30) Foreign Application Priority Data

Sep. 1, 2009    (KR) .................. 10-2009-0081973

(51) Int. Cl.
*G02F 1/01* (2006.01)
*H01L 31/0232* (2006.01)

(52) U.S. Cl. ........ 359/279; 359/248; 257/432; 257/438; 257/448; 257/461; 257/465; 257/466; 385/2; 385/8; 385/10; 385/37; 385/50

(58) Field of Classification Search .................. 257/432, 257/438, 448, 461, 465, 466; 385/2, 8, 10, 385/37, 50; 359/248, 279
See application file for complete search history.

(56) References Cited

U.S. PATENT DOCUMENTS

| 3,748,597 A | * | 7/1973 | Reinhart ................. 359/279 |
| 5,908,305 A | | 6/1999 | Crampton et al. |
| 2006/0008223 A1 | | 1/2006 | Gunn, III et al. |

OTHER PUBLICATIONS

Carlos Angulo Barrios et al., "Low-Power-Consumption Short-Length and High-Modulation-Dept Silicon Electrooptic Modulator," Journal of Lightwave Technology, Apr. 2003, pp. 1089-1098, vol. 21. No. 4, IEEE.

Ansheng Liu et al., "A high-speed silicon optical modulator based on a metal-oxide-semiconductor capacitor," Nature, Feb. 2004, pp. 615-618, vol. 427, Nature Publishing Group.

Ansheng Liu et al., "High-speed optical modulation based on carrier depletion in a silicon waveguide," Optics Express, Jan. 2007, pp. 660-668, vol. 15, No. 2, OSA.

* cited by examiner

*Primary Examiner* — Evelyn A. Lester

(57) ABSTRACT

An electro-optic device is provided. The electro-optic device includes a junction layer disposed between a first conductivity type semiconductor layer and a second conductivity type semiconductor layer to which a reverse vias voltage is applied. The first conductivity type semiconductor layer and the second conductivity type semiconductor layer have an about 2 to 4-time doping concentration difference therebetween, thus making it possible to provide the electro-optic device optimized for high speed, low power consumption and high integration.

19 Claims, 5 Drawing Sheets

ELECTRO-OPTIC DEVICE

CROSS-REFERENCE TO RELATED APPLICATIONS

This U.S. non-provisional patent application claims priority under 35 U.S.C. §119 of Korean Patent Application No. 10-2009-0081973, filed on Sep. 1, 2009, the entire contents of which are hereby incorporated by reference.

BACKGROUND OF THE INVENTION

The present invention disclosed herein relates to electro-optic devices, and more particularly, to an electro-optic device including a diode having a reverse bias voltage applied thereto.

With the development of the semiconductor industry, semiconductor integrated circuits (ICs) such as logic devices and memory devices are becoming higher in speed and integration degree. According to the high speed and the high integration degree of semiconductor ICs, the communication speed between semiconductor ICs is connected directly with the performance of an electronic device including the semiconductor ICs. Typically, semiconductor ICs exchange data through electrical communication. For example, semiconductor ICs are mounted on a printed circuit board (PCB) to perform electrical communication therebetween through interconnections included in the PCB. In this case, there is a limitation in reducing the electrical resistances between the semiconductor ICs (e.g., the resistance between an external terminal of the package and a pad of the semiconductor IC, the contact resistance between the package and the PCB, and the interconnection resistance of the PCB). Also, the electrical communication may be affected by external electromagnetic waves. These factors make it difficult to reduce the communication speed between the semiconductor ICs.

SUMMARY OF THE INVENTION

Embodiments of the present invention provide electro-optic devices with an increased operation speed.

Embodiments of the present invention also provide electro-optic devices optimized for high integration.

Embodiments of the present invention also provide electro-optic devices optimized for low power consumption.

In some embodiments of the present invention, electro-optic devices include: a substrate; an optical modulator being disposed on the substrate and including a first conductivity type semiconductor layer, a second conductivity type semiconductor layer, and a junction layer disposed between the first conductivity type semiconductor layer and the second conductivity type semiconductor layer; and a pair of recessed portions extending from the optical modulator and being thinner than the optical modulator, wherein a reverse bias voltage is applied to the first conductivity type semiconductor layer and the second conductivity type semiconductor layer.

In some embodiments, the first conductivity type semiconductor layer includes a P-type doped region and the second conductivity type semiconductor layer includes an N-type doped region, wherein the doping concentration of the P-type doped region is about 2 to 4 times higher than the doping concentration of the N-type doped region.

In other embodiments, the interfaces between the first conductivity type semiconductor layer, the second conductivity type semiconductor layer and the junction layer intersect the upper surface of the substrate.

In further embodiments, the optical modulator includes a first sidewall and a second sidewall extending respectively from the upper surfaces of the recessed portions, wherein the junction layer is disposed between the first sidewall and the second sidewall.

In still further embodiments, the second conductivity type semiconductor layer is spaced apart from the substrate with the first conductivity type semiconductor layer disposed therebetween.

In still further embodiments, the first conductivity type semiconductor layer is thicker than the recessed portions.

In still further embodiments, the junction layer includes a first surface contacting the first conductivity type semiconductor layer and a second surface contacting the second conductivity type semiconductor layer, wherein the first surface is lower than the upper surfaces of the recessed portions and the second surface is higher than the upper surfaces of the recessed portions.

In still further embodiments, the first conductivity type semiconductor layer is thinner than the recessed portions.

In still further embodiments, the optical modulator includes a light-receiving surface receiving a first optical signal and a light-outputting surface outputting a second optical signal, wherein a phase of the second optical signal depends on the level of the reverse bias voltage.

In still further embodiments, the electro-optic devices further include at least one grating coupler connected to at least one of the light-receiving surface and the light-outputting surface of the optical modulator.

In still further embodiments, an optical absorption factor of the junction layer depends on the level of the reverse bias voltage.

In still further embodiments, the electro-optic devices further include a cladding layer disposed between the substrate and the optical modulator.

In still further embodiments, the cladding layer is formed by implanting oxygen ions selectively at a portion for an optical waveguide on the substrate.

In still further embodiments, the cladding layer includes a silicon oxide and the vertical concentration of the silicon oxide has a Gaussian distribution.

In still further embodiments, the substrate includes a switching region spaced apart from the optical modulator, and the electro-optic devices further include: a gate insulating layer disposed on the switching region of the substrate; and a gate electrode disposed on the gate insulating layer.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
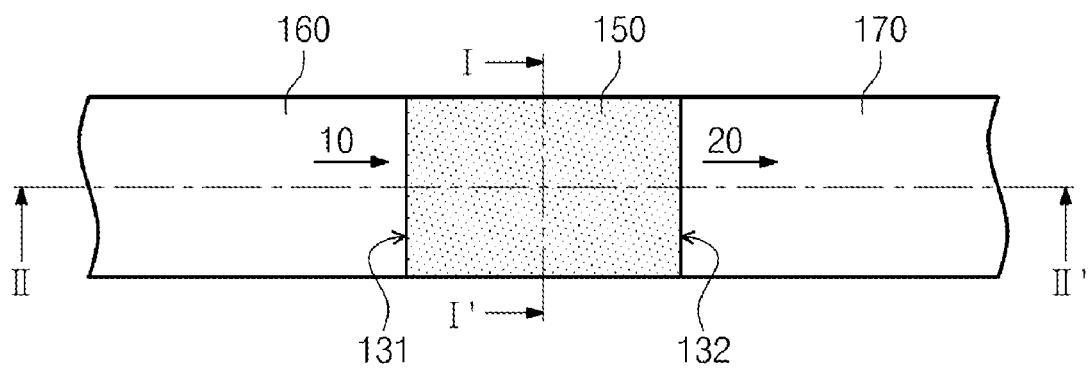
FIG. 1 is a plan view of an electro-optic device according to an embodiment of the present invention.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Since preferred embodiments are provided below, the order of the reference numerals given in the description is not limited thereto. In the drawings, the dimensions of layers and regions may be exaggerated for clarity of illustration. It will be understood that when a layer (or film) is referred to as being "on" another layer or substrate, it can be directly on the other layer or substrate, or intervening layers may also be present. As used herein, the term and/or includes any and all combinations of one or more of the associated listed items. Throughout the specification, like reference numerals refer to like elements.

Hereinafter, a description will be given of an electro-optic device according to an embodiment of the present invention.

Figure 2A:
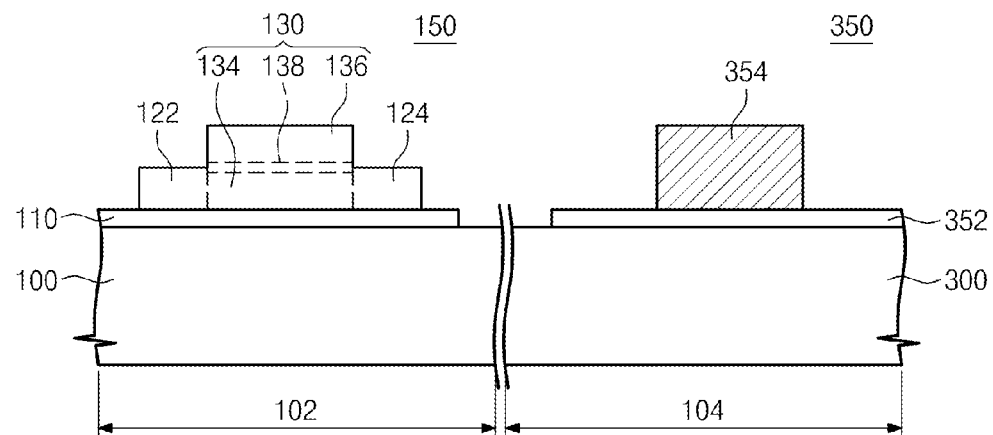
FIG. 2A is a sectional view of an electro-optic device according to an embodiment of the present invention.
Figure 3:
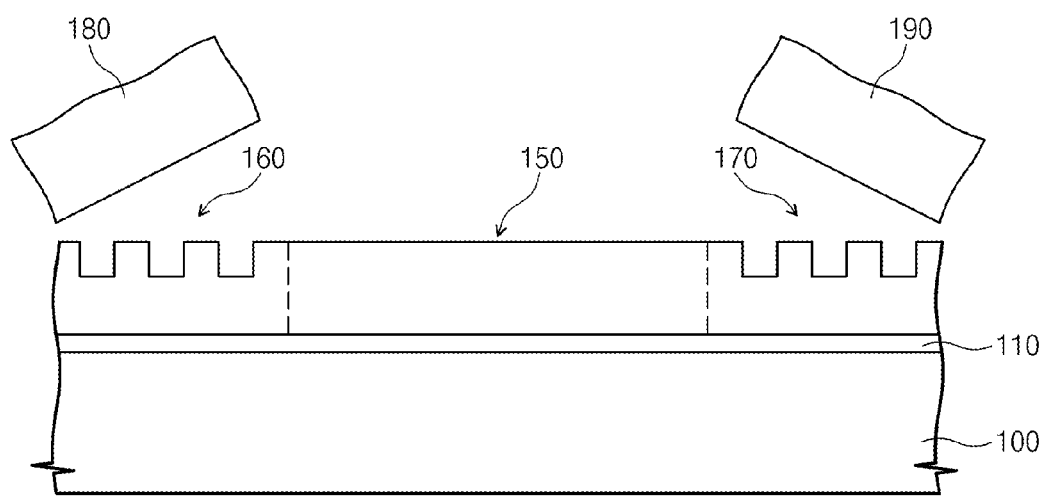
FIG. 3 is a sectional view of an electro-optic device according to an embodiment of the present invention.

FIG. 1 is a plan view of an electro-optic device according to an embodiment of the present invention. An electro-optic region 102 of FIG. 2A is a sectional view taken along a line I-I' of FIG. 1, and a switching region 104 of FIG. 2A may be a peripheral circuit region spaced apart from the electro-optic region 102. FIG. 3 is a sectional view taken along a line II-II' of FIG. 1.

Referring to FIGS. 1, 2A and 3, a substrate 100 is provided. The substrate 100 may be a silicon substrate or a Silicon-On-Insulator (SOI) substrate. The substrate 100 may include an electro-optic region 102 and a switching region 104.

An electro-optic device 150 may be disposed on the substrate 100 of the electro-optic region 102. The electro-optic device 150 may include an optical modulator 130 that extends in a first direction. The electro-optic device 150 may include a first recessed portion 122 and a second recessed portion 124 that extend in the first direction and are disposed respectively at both sides of the optical modulator 130. The optical modulator 130 may be a region that transmits optical signals. The optical modulator 130 and the recessed portions 122 and 124 may be united into one body. The optical modulator 130 may be thicker than the recessed portions 122 and 124. The upper surface of the optical modulator 130 may be higher than the upper surfaces of the recessed portions 122 and 124. The upper surfaces of the recessed portions 122 and 124 may be flat. The electro-optic device 150 may include silicon.

The optical modulator 130 may include a first conductivity type semiconductor layer 134 disposed on the substrate 100. The optical modulator 130 may include a second conductivity type semiconductor layer 136 disposed on the first conductivity type semiconductor layer 134. The optical modulator 130 may include a junction layer 138 disposed between the first conductivity type semiconductor layer 134 and the second conductivity type semiconductor layer 136.

The first conductivity type semiconductor layer 134 and the second conductivity type semiconductor layer 136 may include regions doped with different dopants. For example, the first conductivity type semiconductor layer 134 may include a region doped with P-type dopants, and the second conductivity type semiconductor layer 136 may include a region doped with N-type dopants. Unlike this, the first conductivity type semiconductor layer 134 may include a region doped with N-type dopants, and the second conductivity type semiconductor layer 136 may include a region doped with P-type dopants. The junction layer 138 may be a depletion region. The density of carriers in the depletion region may be lower than the density of carriers in the first conductivity type semiconductor layer 134 and the second conductivity type semiconductor layer 136. The first conductivity type semiconductor layer 134, the second conductivity type semiconductor layer 136, and the junction layer 138 may constitute a diode. The doping concentration of the region doped with P-type dopants may be different from the doping concentration of the region doped with N-type dopants. Preferably, the doping concentration of the region doped with P-type dopants may be about 2 to 4 times higher than the doping concentration of the region doped with N-type dopants.

A reverse bias voltage may be applied to the first conductivity type semiconductor layer 134 and the second conductivity type semiconductor layer 136. For example, if the first conductivity type semiconductor layer 134 includes a region doped with P-type dopants and the second conductivity type semiconductor layer 136 includes a region doped with N-type dopants, a voltage applied to the first conductivity type semiconductor layer 134 may be lower than a voltage applied to the second conductivity type semiconductor layer 136. Unlike this, if the first conductivity type semiconductor layer 134 includes a region doped with N-type dopants and the second conductivity type semiconductor layer 136 includes a region doped with P-type dopants, a voltage applied to the first conductivity type semiconductor layer 134 may be higher than a voltage applied to the second conductivity type semiconductor layer 136.

The thickness of the junction layer 138 may be controlled according to the level of the reverse bias voltage applied to the first conductivity type semiconductor layer 134 and the second conductivity type semiconductor layer 136. The carrier density of the optical modulator 130 may be controlled according to the level of the reverse bias voltage. For example, as the level of the reverse vias voltage increases, the thickness of the junction layer 138 increases, thus reducing the carrier density of the optical modulator 130.

The junction layer 138 may include a first surface contacting the first conductivity type semiconductor layer 134 and a second surface contacting the second conductivity type semiconductor layer 136. The first surface of the junction layer 138 may be lower than the upper surfaces of the recessed portions 122 and 124. The second surface of the junction layer 138 may be higher than the upper surfaces of the recessed portions 122 and 124. The recessed portions 122 and 124 may include a region that is doped with the same dopants as the first conductivity type semiconductor layer 134.

A cladding layer 110 may be disposed between the substrate 100 and the optical modulator 130. The cladding layer 110 may be disposed between the substrate 100 and the recessed portions 122 and 124. The cladding layer 110 may be disposed over the substrate 100. The cladding layer 110 may include a material that has a different refractive index than the optical modulator 130. For example, the cladding layer 110 may include an oxide layer. The cladding layer 110 may include a buried oxide layer of a SOI substrate. Unlike this, the cladding layer 110 may be formed by implanting oxygen ions at a predetermined depth of a bulk semiconductor substrate by ion implantation. The oxygen ion implantation may be selectively performed at a portion for an optical waveguide. This means implanting oxygen ions selectively at a portion for an optical waveguide in the substrate. If the substrate 100 includes silicon, the cladding layer 110 may include silicon oxide. The vertical concentration of the silicon oxide may have a Gaussian distribution.

The electro-optic device 150 may include a light-receiving surface 131 receiving a first optical signal 10. The first optical signal 10 may be received from a first optical waveguide 160. The first optical signal 10 may travel in the first direction. The electro-optic device 150 may include a light-outputting surface 132 outputting a second optical signal 20. The second optical signal 20 may be outputted to a second optical waveguide 170. The second optical signal 20 may travel in the first direction.

The optical modulator 130 may absorb the first optical signal 10 received through the light-receiving surface 131. The first optical signal 10 may have a higher intensity than the second optical signal 20. The optical absorption factor of the optical modulator 130 may depend on the carrier density of the optical modulator 130. The carrier density of the optical modulator 130 may depend on the thickness of the junction layer 138. The thickness of the junction layer 138 may depend on the level of the reverse bias voltage applied to the first conductivity type semiconductor layer 134 and the second conductivity type semiconductor layer 136.

The refractive index of the optical modulator 130 may depend on the carrier density of the optical modulator 130. The carrier density of the optical modulator 130 may depend on the thickness of the junction layer 138. The thickness of the junction layer 138 may depend on the level of the reverse bias voltage applied to the first conductivity type semiconductor layer 134 and the second conductivity type semiconductor layer 136. For example, as the level of the reverse bias voltage increases, the thickness of the junction layer 138 may increase. If the thickness of the junction layer 138 increases, the carrier density of the optical modulator 130 may decrease. If the carrier density of the optical modulator 130 decreases, the refractive index of the optical modulator 130 may decrease. The second optical signal 20 and the first optical signal 10 entering the optical modulator 130 may have a phase difference due to a variation in the refractive index of the optical modulator 130.

Specifically, the phase difference between the first optical signal 10 and the second optical signal 20 may be controlled by a variation in an effective refractive index of the optical modulator 130. The variation in the effective refractive index may be defined as the product of the variation in the refractive index and a confinement factor. The confinement factor may be defined as the ratio of the intensity of an optical signal passing a portion with a variable refractive index in the optical modulator 130 to the total intensity of an optical signal passing the optical modulator 130. The variation in the refractive index may be represented as the variation in the refractive index of the optical modulator 130 according to the level of the reverse bias voltage applied to the first conductivity type semiconductor layer 134 and the second conductivity type semiconductor layer 136.

Accordingly, as the variation in the refractive index of the optical modulator 130 increases and the intensity of an optical signal passing the junction layer 138 increases, the variation in the effective refractive index of the optical modulator 130 may increase. As the variation in the effective refractive index of the optical modulator 130 increases, the phase modulation speed of the optical signal may increase.

A semiconductor device 350 may be provided on the substrate 100 of the switching region 104. The semiconductor device 350 may include a gate insulating layer 352 on the substrate 100. The semiconductor device 350 may include a gate electrode 354 on the gate insulating layer 352. The gate insulating layer 352 may include at least one of a silicon oxynitride layer, a silicon nitride layer, a silicon oxide layer and a metal oxide layer. The gate electrode 354 may include at least one of a doped polysilicon layer, a metal layer and a metal oxide layer.

An optical device may be disposed on the substrate 100. The optical device may include an arrayed waveguide grating (AWG) device or grating couplers 160 and 170. The first grating coupler 160 may be connected to the light-receiving surface 131 of the electro-optic device 150. The first grating coupler 160 includes an input transmission region and an input diffraction grating. The input diffraction grating is disposed on the surface of the input transmission region. The input transmission region may be formed of a semiconductor. A first optical fiber 180 may be disposed on the first grating coupler 160. An optical signal irradiated from the first optical fiber 180 is provided through the input diffraction grating to the input transmission region. At this point, due to the input diffraction grating, an optical signal in the input transmission region is inputted to the optical device 150 in a direction parallel to the upper surface of the substrate 100.

The second grating coupler 170 may be connected to the light-outputting surface 132 of the electro-optic device 150. The second grating coupler 170 may include an output transmission region and an output diffraction grating. The output diffraction grating is disposed on the upper surface of the output transmission region. The output transmission region may be formed of a semiconductor. A second optical fiber 190 may be disposed on the second grating coupler 170. An optical signal phase-shifted by passing the electro-optic device 150 is supplied through the output transmission region and the output diffraction grating to the second optical fiber 190. The optical signal supplied to the second optical fiber 190 may be supplied to another semiconductor chip and/or another electronic medium.

Figure 2B:
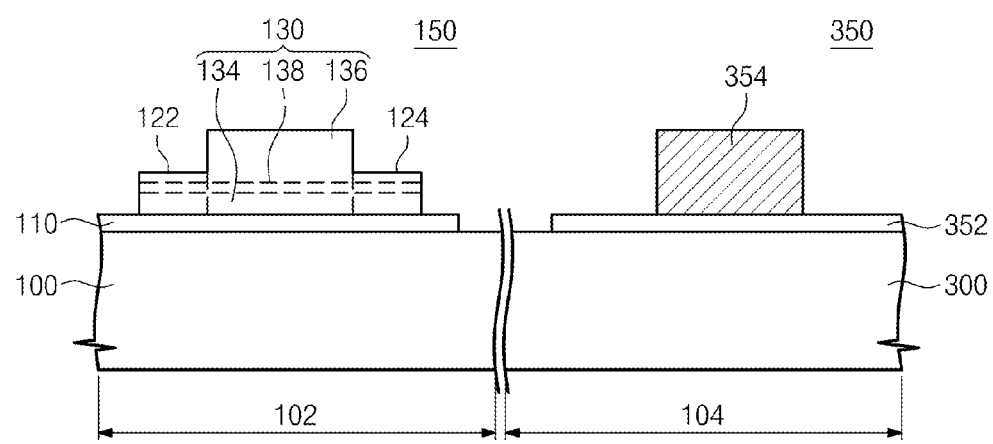
FIG. 2B is a sectional view of an electro-optic device according to a modification of an embodiment of the present invention.

Hereinafter, a description will be given of an electro-optic device according to a modification of an embodiment of the present invention. FIG. 2B is a sectional view of an electro-optic device according to a modification of an embodiment of the present invention. An electro-optic region 102 of FIG. 2B is a sectional view taken along a line I-I' of FIG. 1, and a switching region 104 of FIG. 2B may be a peripheral circuit region spaced apart from the electro-optic region 102. A description of an overlap with FIG. 2A will be omitted for conciseness.

Referring to FIG. 2B, a first conductivity type semiconductor layer 134 may be thinner than recessed portions 122 and 124. A junction layer 138 may be lower than the upper surfaces of the recessed portions 122 and 124.

The recessed portions 122 and 124 may include a region that is doped with the same dopants as the first conductivity type semiconductor layer 134 and the second conductivity type semiconductor layer 136. The junction layer 138 may extend from the optical modulator 130 to the recessed portions 122 and 124.

Figure 2C:
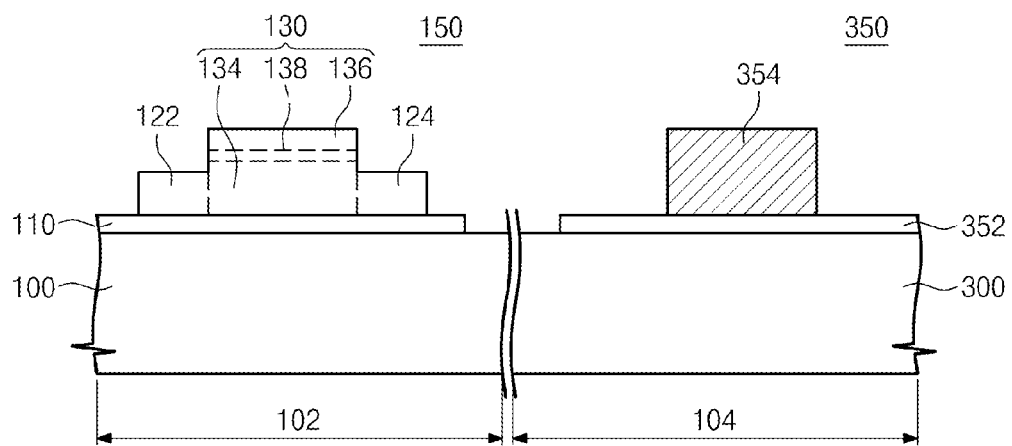
FIG. 2C is a sectional view of an electro-optic device according to another modification of an embodiment of the present invention.

Hereinafter, a description will be given of an electro-optic device according to another modification of an embodiment of the present invention. FIG. 2C is a sectional view of an electro-optic device according to another modification of an embodiment of the present invention. An electro-optic region 102 of FIG. 2C is a sectional view taken along a line I-I' of FIG. 1, and a switching region 104 of FIG. 2C may be a peripheral circuit region spaced apart from the electro-optic region 102. A description of an overlap with FIG. 2A will be omitted for conciseness.

Referring to FIG. 2C, a first conductivity type semiconductor layer 134 may be thicker than recessed portions 122 and 124. A junction layer 138 may be higher than the upper surfaces of the recessed portions 122 and 124. The recessed portions 122 and 124 may include a region that is doped with the same dopants as the first conductivity type semiconductor layer 134.

Figure 4:
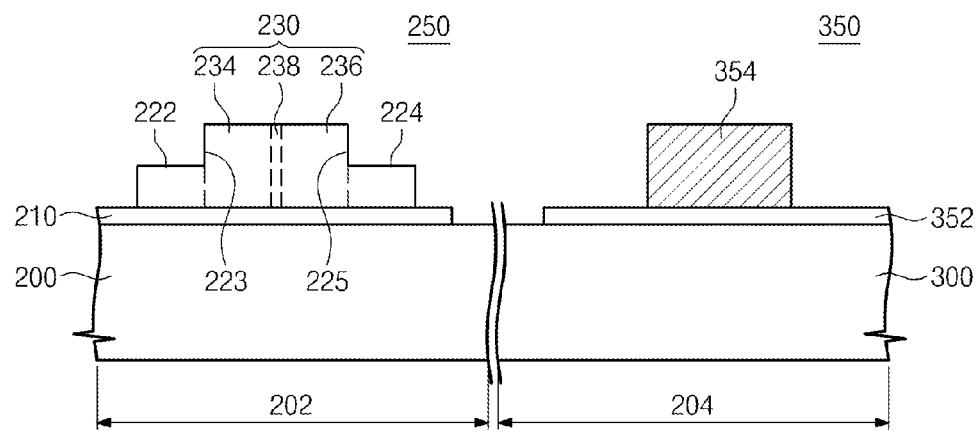
FIG. 4 is a sectional view of an electro-optic device according to another embodiment of the present invention.

Hereinafter, a description will be given of an electro-optic device according to another embodiment of the present invention. FIG. 4 is a sectional view of an electro-optic device according to another embodiment of the present invention. An electro-optic region 202 of FIG. 4 is a sectional view taken along a line I-I' of FIG. 1, and a switching region 204 of FIG. 4 may be a peripheral circuit region spaced apart from the electro-optic region 202.

Referring to FIGS. 1, 3 and 4, a substrate 200 may include an electro-optic region 202 and a switching region 204. An electro-optic device 250 may be disposed on the substrate 200 of the electro-optic region 202. The electro-optic device 250 may include an optical modulator 230 and recessed portions 222 and 224. The recessed portions 222 and 224 may extend from the optical modulator 230 and may be thinner than the optical modulator 230. The optical modulator 230 may extend in a first direction. The optical modulator 230 may be a region that transmits optical signals. The optical modulator 230 and the recessed portions 222 and 224 may be united into one body.

The optical modulator 230 may include a first conductivity type semiconductor layer 234 and a second conductivity type semiconductor layer 236 that are disposed on the substrate 200. The optical modulator 230 may include a junction layer 238 disposed between the first conductivity type semiconductor layer 234 and the second conductivity type semiconductor layer 236.

The interfaces between the first conductivity type semiconductor layer 234, the second conductivity type semiconductor layer 236 and the junction layer 238 may intersect the upper surface of the substrate 200. The interfaces may be perpendicular to the upper surface of the substrate 200. A reverse bias voltage may be applied to the first conductivity type semiconductor layer 234 and the second conductivity type semiconductor layer 236.

The doping concentration of the first conductivity type semiconductor layer 234 may be about 2 to 4 times higher than the doping concentration of the second conductivity type semiconductor layer 236. The first conductivity type semiconductor layer 234 may include a region doped with P-type dopants, and the second conductivity type semiconductor layer 236 may include a region doped with N-type dopants. The doping concentration of the region doped with P-type dopants is about 2 to 4 times higher than the doping concentration of the region doped with N-type dopants.

The optical modulator 230 may include a light-receiving surface 131 receiving a first optical signal 10 and a light-outputting surface 132 outputting a second optical signal 20. The phase difference between the first optical signal 10 and the second optical signal 20 may depend on the level of the reverse bias voltage. The optical absorption factor of the junction layer 238 with respect to the first optical signal 10 may depend on the level of the reverse bias voltage.

A cladding layer 210 may be disposed between the substrate 200 and the optical modulator 230. The cladding layer 210 may be disposed between the substrate 200 and the recessed portions 222 and 224.

The optical modulator 230 may include a first sidewall 223 and a second sidewall 225 that extend respectively from the upper surfaces of the recessed portions 222 and 224. Specifically, the first sidewall 223 may be the sidewall of the first conductivity type semiconductor layer 234 that extend from the upper surface of the first recessed portion 222. The second sidewall 225 may be the sidewall of the second conductivity type semiconductor layer 236 that extend from the upper surface of the second recessed portion 224. The junction layer 238 may be disposed between the first sidewall 223 and the second sidewall 225.

The first recessed portion 222 may include a region that is doped with the same dopants as the first conductivity type semiconductor layer 234. The second recessed portion 224 may include a region that is doped with the same dopants as the second conductivity type semiconductor layer 236.

A semiconductor device 350 including a gate insulating layer 352 and a gate electrode 354 may be provided on the substrate 200 of the switching region 204. The gate electrode 354 may include a doped polysilicon.

An optical device may be disposed on the substrate 200. The optical device may include an arrayed waveguide grating (AWG) device or grating couplers 160 and 170. The first grating coupler 160 may be connected to the light-receiving surface 131 of the electro-optic device 250. The first grating coupler 160 includes an input transmission region and an input diffraction grating. The input diffraction grating is disposed on the surface of the input transmission region. The input transmission region may be formed of a semiconductor. A first optical fiber 180 may be disposed on the first grating coupler 160. An optical signal irradiated from the first optical fiber 180 is provided through the input diffraction grating to the input transmission region. At this point, due to the input diffraction grating, an optical signal in the input transmission region is inputted to the optical device 150 in a direction parallel to the upper surface of the substrate 200.

The second grating coupler 170 may be connected to the light-outputting surface 132 of the electro-optic device 250. The second grating coupler 170 may include an output transmission region and an output diffraction grating. The output diffraction grating is disposed on the upper surface of the output transmission region. The output transmission region may be formed of a semiconductor. A second optical fiber 190 may be disposed on the second grating coupler 170. An optical signal phase-shifted by passing the electro-optic device 250 is supplied through the output transmission region and the output diffraction grating to the second optical fiber 190. The optical signal supplied to the second optical fiber 190 may be supplied to another semiconductor chip and/or another electronic medium.

Hereinafter, a description will be given of a variation in the effective refractive index of the optical modulator according to embodiments of the present invention.

Figure 6:
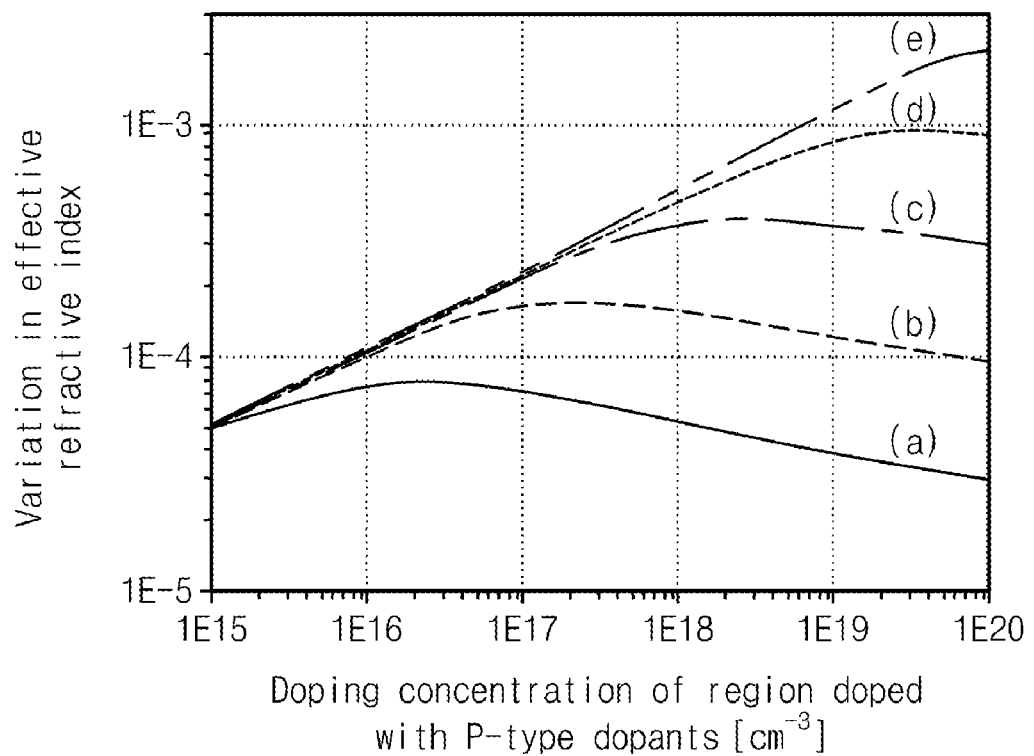
FIG. 6 is a graph illustrating a variation in the effective refractive index of an optical modulator according to embodiments of the present invention.

FIG. 6 is a graph illustrating a variation in the effective refractive index of the optical modulator according to embodiments of the present invention.

Referring to FIG. 6, the graph represents the results of measurement of the variation in the effective refractive index when the reverse bias voltage is applied to the P-type doped region and the N-type doped region. The axis of abscissas represents the doping concentration of the P-type doped region, and the axis of ordinates represents the variation in the effective refractive index.

A curve a) represents the variation in the effective refractive index according to a variation in the doping concentration of the P-type doped region when the doping concentration of the N-type doped region is fixed at $10^{16}$ cm$^{-3}$. A curve b) represents the variation in the effective refractive index according to a variation in the doping concentration of the P-type doped region when the doping concentration of the N-type doped region is fixed at $10^{17}$ cm$^{-3}$. A curve c) represents the variation in the effective refractive index according to a variation in the doping concentration of the P-type doped region when the doping concentration of the N-type doped region is fixed at $10^{18}$ cm$^{-3}$. A curve d) represents the variation in the effective refractive index according to a variation in the doping concentration of the P-type doped region when the doping concentration of the N-type doped region is fixed at $10^{19}$ cm$^{-3}$. A curve e) represents the variation in the effective refractive index according to a variation in the doping concentration of the P-type doped region when the doping concentration of the N-type doped region is fixed at $10^{20}$ cm$^{-3}$.

As the doping concentrations of the P-type doped region and the N-type doped region increase, the variation in the effective refractive index increases. In particular, if the doping concentration of the P-type doped region is about 2 to 4 times higher than the doping concentration of the N-type doped region, the variation in the effective refractive index may be maximized.

According to the embodiments of the present invention, the first conductivity type semiconductor layer 134 and the second conductivity type semiconductor layer 136 are doped with different dopants (i.e., N-type dopants and P-type dopants), and the doping concentration of the P-type doped region is about 2 to 4 times higher than the doping concentration of the N-type doped region, thus making it possible to provide the electro-optic device optimized for high efficiency and low power consumption.

Hereinafter, a description will be given of an application example of an electro-optic device according to embodiments of the present invention.

Figure 5:
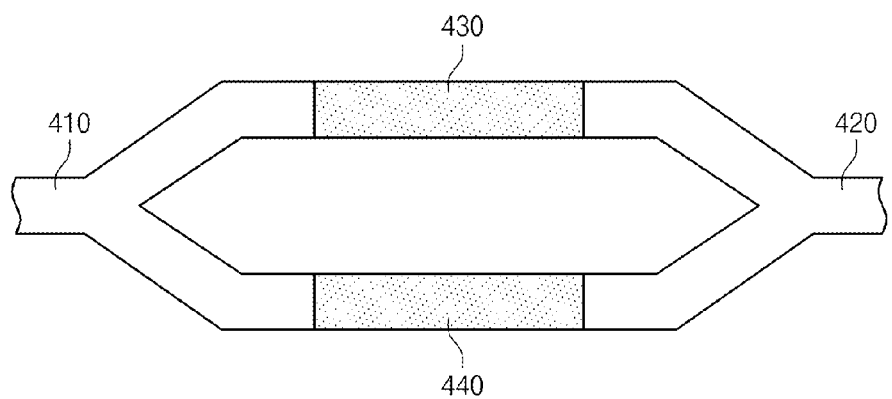
FIG. 5 is a plan view illustrating an application example of an electro-optic device according to embodiments of the present invention.

FIG. 5 is a plan view illustrating an application example of an electro-optic device according to embodiments of the present invention.

Referring to FIG. 5, A Mach-Zehnder interferometer may include an input Y-branch 410, a first electro-optic device 430, an output Y-branch 420, and a second electro-optic device 440. One of the first and second electro-optic devices 430 and 440 may include the electro-optic device according to the embodiments of the present invention. Unlike this, both of the electro-optic devices 430 and 440 may include the electro-optic device according to the embodiments of the present invention.

The first electro-optic device 430 and the second electro-optic device 440 may be connected between two arms of the input Y-branch 410 and two arms of the output Y-branch 420. An optical signal may be inputted to the input Y-branch 410. The optical signal inputted to the input Y-branch 410 may be divided into first and second optical signals at the branch point of the input Y-branch 410. The first optical signal and the second optical signal may be inputted respectively to the first electro-optic device 430 and the second electro-optic device 440. The first and second optical signals inputted to the first and second electro-optic devices 430 and 440 may be phase-shifted by passing the first and second electro-optic devices 430 and 440. The optical signals passing the first and second electro-optic devices 430 and 440 may be combined at the output Y-branch 420. When combined at the output Y-branch, the optical signals may destructively or constructively interfere with each other. The occurrence of the destructive interference or the constructive interference may depend on the phase variation of the optical signals passing the electro-optic devices 430 and 440. The phase variation of the optical signals may depend on the level of a reverse bias voltage applied to the electro-optic devices 430 and 440.

As described above, the present invention can provide electro-optic devices that are optimized for high-speed optical modulation, low power consumption and high integration by a first conductivity type semiconductor layer and a second conductivity type semiconductor layer that have a specific doping concentration difference therebetween and have a reverse bias voltage applied thereto.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electro-optic device comprising:
   a substrate;
   an optical modulator being disposed over the substrate and including a first conductivity type semiconductor layer, a second conductivity type semiconductor layer, and a junction layer disposed between the first conductivity type semiconductor layer and the second conductivity type semiconductor layer; and
   a pair of recessed portions each extending from first and second sidewalls of the optical modulator and each having an upper surface disposed below an upper surface of the optical modulator,
   wherein a reverse bias voltage is applied to the first conductivity type semiconductor layer and the second conductivity type semiconductor layer.

2. The electro-optic device of claim 1,
   wherein the second conductivity type semiconductor layer is spaced apart from the substrate with the first conductivity type semiconductor layer disposed therebetween.

3. The electro-optic device of claim 1,
   wherein an interface between the first conductivity type semiconductor layer and the junction layer, and an interface between the second conductivity type semiconductor layer and the junction layer are each arranged perpendicular to an upper surface of the substrate.

4. The electro-optic device of claim 1,
   wherein an upper surface of the first conductivity type semiconductor layer is formed at a level higher than upper surfaces of the recessed portions.

5. The electro-optic device of claim 1,
   wherein the junction layer includes a first surface contacting the first conductivity type semiconductor layer and a second surface contacting the second conductivity type semiconductor layer, and
   wherein the first surface is lower than upper surfaces of the recessed portions and the second surface is higher than upper surfaces of the recessed portions.

6. The electro-optic device of claim 1,
   wherein the pair of recessed portions includes first and second recesses extending from the first and the second sidewalls of the optical modulator, respectively,
   wherein a first optical signal enters into the optical modulator through the first recess,
   wherein a second optical signal outputs from the optical modulator through the second recess, and
   wherein a phase of the second optical signal depends on an intensity of the reverse bias voltage.

7. An electro-optic device comprising:
a substrate;
an optical modulator being disposed over the substrate and including a first conductivity type semiconductor layer, a second conductivity type semiconductor layer, and a junction layer disposed between the first conductivity type semiconductor layer and the second conductivity type semiconductor layer; and
a pair of recessed portions each extending from first and second sidewalls of the optical modulator and being thinner than the optical modulator,
wherein a reverse bias voltage is applied to the first conductivity type semiconductor layer and the second conductivity type semiconductor layer,
wherein the first conductivity type semiconductor layer includes a P-type doped region and the second conductivity type semiconductor layer includes an N-type doped region, and
wherein the doping concentration of the P-type doped region is about 2 to 4 times higher than the doping concentration of the N-type doped region.

8. The electro-optic device of claim 7, wherein an upper surface of the first conductivity type semiconductor layer is formed at a level thinner lower than upper surfaces of the recessed portions.

9. The electro-optic device of claim 7,
wherein the optical modulator includes a light-receiving surface receiving a first optical signal and a light-outputting surface outputting a second optical signal, and
wherein a phase of the second optical signal depends on the level a magnitude of the reverse bias voltage.

10. The electro-optic device of claim 9, the electro-optic device further comprising;
at least one grating coupler coupled at least one of the light-receiving surface and the light-outputting surface of the optical modulator.

11. The electro-optic device of claim 7,
wherein an interface between the first conductivity type semiconductor layer and the junction layer, and an interface between the second conductivity type semiconductor layer and the junction layer are each arranged perpendicular to a surface of the substrate.

12. The electro-optic device of claim 7,
wherein the first sidewall and the second sidewall of the optical modulator each extend to a level higher than upper surfaces of the recessed portions, and
wherein the junction layer is disposed between the first sidewall and the second sidewall.

13. The electro-optic device of claim 7,
wherein an upper surface of the first conductivity type semiconductor layer is formed at a level higher than upper surfaces of the recessed portions.

14. The electro-optic device of claim 7,
wherein the junction layer includes a first surface contacting the first conductivity type semiconductor layer and a second surface contacting the second conductivity type semiconductor layer, and
wherein the first surface is lower than upper surfaces of the recessed portions and the second surface is higher than upper surfaces of the recessed portions.

15. An electro-optic device comprising:
a substrate;
an optical modulator being disposed over the substrate and including a first conductivity type semiconductor layer, a second conductivity type semiconductor layer, and a junction layer disposed between the first conductivity type semiconductor layer and the second conductivity type semiconductor layer; and
a pair of recessed portions each extending from first and second sidewalls of the optical modulator and each having an upper surface disposed below an upper surface of the optical modulator,
wherein a reverse bias voltage is applied to the first conductivity type semiconductor layer and the second conductivity type semiconductor layer, and
wherein an optical absorption factor of the junction layer varies depending on a level of the reverse bias voltage applied to the first and the second conductivity type semiconductor layers.

16. The electro-optic device of claim 15, the electro-optic device further comprising;
a cladding layer disposed between the substrate and the optical modulator.

17. The electro-optic device of claim 16,
wherein the cladding layer is formed by implanting oxygen ions selectively at a portion of the semiconductor substrate to form an optical waveguide over the substrate.

18. The electro-optic device of claim 17,
wherein the cladding layer includes a silicon oxide with a concentration in a Gaussian distribution.

19. The electro-optic device of claim 15,
wherein the substrate includes a switching region spaced apart from the optical modulator, and
wherein the electro-optic device further comprises:
a gate insulating layer disposed over the switching region of the substrate; and
a gate electrode disposed over the gate insulating layer.

* * * * *